(12) United States Patent
Solum

(10) Patent No.: US 12,212,933 B2
(45) Date of Patent: *Jan. 28, 2025

(54) MULTI-MODE RADIO FOR HEARING ASSISTANCE DEVICES

(71) Applicant: Starkey Laboratories, Inc., Eden Prairie, MN (US)

(72) Inventor: Jeffrey Paul Solum, Greenwood, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/452,371

(22) Filed: Aug. 18, 2023

(65) Prior Publication Data

US 2024/0089675 A1 Mar. 14, 2024

Related U.S. Application Data

(63) Continuation of application No. 17/750,962, filed on May 23, 2022, now Pat. No. 11,770,661, which is a (Continued)

(51) Int. Cl.
*H04R 25/00* (2006.01)
*H04B 7/26* (2006.01)
*H04R 5/02* (2006.01)

(52) U.S. Cl.
CPC ............ *H04R 25/554* (2013.01); *H04B 7/26* (2013.01); *H04R 25/558* (2013.01); *H04R 2225/51* (2013.01)

(58) Field of Classification Search
CPC H04R 25/554; H04R 25/558; H04R 2225/51; H04B 7/26
(Continued)

(56) References Cited

U.S. PATENT DOCUMENTS 7,256,747 B2 8/2007 Victorian et al.
7,446,720 B2 11/2008 Victorian et al.
(Continued)

FOREIGN PATENT DOCUMENTS

EP 1942702 A1 7/2008
EP 2026406 A1 2/2009
(Continued)

OTHER PUBLICATIONS

"AM/FM radio receiver circuit", Philips Semiconductors TEA5591A Product Specification, (Feb. 1990), 14 pgs.
(Continued)

*Primary Examiner* — Ammar T Hamid
(74) *Attorney, Agent, or Firm* — Schwegman Lundberg & Woessner, P.A.

(57) ABSTRACT

The present disclosure relates to the wireless communication of information for a hearing assistance device including a multi-mode radio adapted to provide communications at different frequencies using frequency control. In applications of hearing aids, the processor is adapted to perform correction of sound for a hearing impaired user. In certain examples the present subject matter provides an inductive portion for inductive communications. In various applications the multi-mode radio can be used for long range and short range communications.

20 Claims, 3 Drawing Sheets

Related U.S. Application Data continuation of application No. 16/906,459, filed on Jun. 19, 2020, now Pat. No. 11,343,622, which is a continuation of application No. 15/963,461, filed on Apr. 26, 2018, now Pat. No. 10,694,300, which is a continuation of application No. 15/250,130, filed on Aug. 29, 2016, now Pat. No. 9,967,683, which is a continuation of application No. 12/830,290, filed on Jul. 3, 2010, now Pat. No. 9,432,780.

(58) Field of Classification Search
USPC .............................................. 381/315, 312
See application file for complete search history.

(56) References Cited

U.S. PATENT DOCUMENTS

| | | | |
|---|---|---|---|
| 7,519,390 B2 | 4/2009 | Malone et al. | |
| 7,529,565 B2 | 5/2009 | Hilpisch et al. | |
| 7,593,538 B2 | 9/2009 | Polinske | |
| 8,098,206 B2 | 1/2012 | Schatzle | |
| 9,432,780 B2 | 8/2016 | Solum | |
| 9,967,623 B2 | 5/2018 | Waller | |
| 9,967,683 B2 | 5/2018 | Solum | |
| 10,694,300 B2* | 6/2020 | Solum | H04R 25/554 |
| 11,343,622 B2 | 5/2022 | Solum | |
| 11,770,661 B2* | 9/2023 | Solum | H04R 25/554 |
| | | | 381/315 |
| 2005/0244024 A1 | 11/2005 | Fischer et al. | |
| 2006/0274747 A1 | 12/2006 | Duchscher et al. | |
| 2008/0095387 A1 | 4/2008 | Niederdrank et al. | |
| 2008/0159548 A1 | 7/2008 | Solum | |
| 2008/0300658 A1 | 12/2008 | Meskens | |
| 2008/0304686 A1 | 12/2008 | Meskens et al. | |
| 2009/0046879 A1* | 2/2009 | Knudsen | H01Q 7/08 |
| | | | 381/315 |
| 2009/0189769 A1 | 7/2009 | Schaffler et al. | |
| 2009/0196444 A1 | 8/2009 | Solum | |
| 2010/0074461 A1 | 3/2010 | Polinske | |
| 2010/0158291 A1 | 6/2010 | Polinske et al. | |
| 2010/0158292 A1 | 6/2010 | Pedersen | |
| 2010/0158293 A1 | 6/2010 | Polinske et al. | |
| 2010/0158295 A1 | 6/2010 | Polinske et al. | |
| 2010/0188170 A1 | 7/2010 | Kroekenstoel et al. | |
| 2010/0208631 A1 | 8/2010 | Zhang et al. | |
| 2010/0310101 A1 | 12/2010 | Anderson | |
| 2011/0019830 A1 | 1/2011 | Leibman et al. | |
| 2011/0150232 A1 | 6/2011 | Kalluri et al. | |
| 2011/0150255 A1 | 6/2011 | Solum | |
| 2011/0222621 A1 | 9/2011 | Christensen et al. | |
| 2012/0002830 A1 | 1/2012 | Solum | |
| 2016/0066105 A1* | 3/2016 | Dickel | H04R 25/558 |
| | | | 381/314 |
| 2016/0100280 A1 | 4/2016 | Wright | |
| 2017/0085999 A1 | 3/2017 | Solum | |
| 2018/0249260 A1 | 8/2018 | Solum | |
| 2019/0200144 A1* | 6/2019 | Kvist | H04R 25/554 |
| 2019/0246216 A1* | 8/2019 | Frederiksen | A61B 5/0008 |
| 2020/0322739 A1 | 10/2020 | Solum | |
| 2023/0007410 A1 | 1/2023 | Solum | |

FOREIGN PATENT DOCUMENTS

| | | | |
|---|---|---|---|
| EP | 2052758 A1 | 4/2009 | |
| EP | 2282412 A1 | 2/2011 | |
| EP | 2403273 A1 | 1/2012 | |
| EP | 2403273 B1 | 8/2014 | |
| WO | WO-2006133158 A1 | 12/2006 | |

OTHER PUBLICATIONS

"U.S. Appl. No. 12/830,290, Advisory Action mailed May 22, 2015", 3 pgs.

"U.S. Appl. No. 12/830,290, Advisory Action mailed Dec. 18, 2013", 3 pgs.

"U.S. Appl. No. 12/830,290, Examiner Interview Summary mailed Dec. 18, 2013", 2 pgs.

"U.S. Appl. No. 12/830,290, Final Office Action mailed Feb. 3, 2015", 13 pgs.

"U.S. Appl. No. 12/830,290, Final Office Action mailed Sep. 12, 2013", 14 pgs.

"U.S. Appl. No. 12/830,290, Non Final Office Action mailed Mar. 13, 2014", 13 pgs.

"U.S. Appl. No. 12/830,290, Non Final Office Action mailed Mar. 14, 2013", 12 pgs.

"U.S. Appl. No. 12/830,290, Non Final Office Action mailed Aug. 20, 2014", 12 pgs.

"U.S. Appl. No. 12/830,290, Non Final Office Action mailed Sep. 30, 2015", 13 pgs.

"U.S. Appl. No. 12/830,290, Notice of Allowance mailed Apr. 28, 2016", 9 pgs.

"U.S. Appl. No. 12/830,290, Response filed Jan. 20, 2014 to Advisory Action mailed Dec. 18, 2013", 8 pgs.

"U.S. Appl. No. 12/830,290, Response filed Jan. 29, 2016 to Non Final Office Action mailed Sep. 30, 2015", 9 pgs.

"U.S. Appl. No. 12/830,290, Response filed Jun. 13, 2014 to Non Final Office Action mailed Mar. 13, 2014", 8 pgs.

"U.S. Appl. No. 12/830,290, Response filed Jun. 14, 2013 to Non Final Office Action mailed Mar. 14, 2013", 7 pgs.

"U.S. Appl. No. 12/830,290, Response filed Nov. 12, 2013 to Final Office Action mailed Sep. 22, 2013", 8 pgs.

"U.S. Appl. No. 12/830,290, Response filed Nov. 20, 2014 to Non Final Office Action maled Aug. 20, 2014", 9 pgs.

"U.S. Appl. No. 15/250,130, Non Final Office Action mailed Jun. 19, 2017", 19 pgs.

"U.S. Appl. No. 15/250,130, Notice of Allowance mailed Jan. 4, 2018", 11 pgs.

"U.S. Appl. No. 15/250,130, Preliminary Amendment filed Dec. 8, 2016", 6 pgs.

"U.S. Appl. No. 15/250,130, Response filed Sep. 19, 2017 to Non Final Office Action mailed Jun. 19, 2017", 8 pgs.

"U.S. Appl. No. 15/963,461, Advisory Action mailed Sep. 16, 2019", 3 pgs.

"U.S. Appl. No. 15/963,461, Final Office Action mailed Jun. 20, 2019", 27 pgs.

"U.S. Appl. No. 15/963,461, Non Final Office Action mailed Oct. 24, 2019", 24 pgs.

"U.S. Appl. No. 15/963,461, Non Final Office Action mailed Nov. 19, 2018", 21 pgs.

"U.S. Appl. No. 15/963,461, Notice of Allowance mailed Feb. 20, 2020", 9 pgs.

"U.S. Appl. No. 15/963,461, Preliminary Amendment Filed Apr. 27, 2018", 5 pgs.

"U.S. Appl. No. 15/963,461, Response Filed Jan. 21, 2019 to Non Final Office Action mailed Oct. 24, 2019", 9.

"U.S. Appl. No. 15/963,461, Response filed Feb. 18, 2019 to Non Final Office Action mailed Nov. 19, 2018", 8 pgs.

"U.S. Appl. No. 15/963,461, Response filed Aug. 20, 2019 to Final Office Action mailed Jun. 20, 2019", 9 pgs.

"U.S. Appl. No. 16/906,459, Corrected Notice of Allowability mailed Feb. 2, 2022", 2 pgs.

"U.S. Appl. No. 16/906,459, Corrected Notice of Allowability mailed Feb. 9, 2022", 2 pgs.

"U.S. Appl. No. 16/906,459, Final Office Action mailed Oct. 1, 2021", 17 pgs.

"U.S. Appl. No. 16/906,459, Non Final Office Action mailed Jun. 8, 2021", 20 pgs.

"U.S. Appl. No. 16/906,459, Notice of Allowance mailed Jan. 20, 2022", 9 pgs.

"U.S. Appl. No. 16/906,459, Preliminary Amendment filed Jun. 23, 2020", 6 pgs.

"U.S. Appl. No. 16/906,459, Response filed Jan. 3, 2022 to Final Office Action mailed Oct. 1, 2021", 6 pgs.

"U.S. Appl. No. 16/906,459, Response filed Sep. 8, 2021 to Non Final Office Action mailed Jun. 8, 2021", 9 pgs.

"U.S. Appl. No. 17/750,962, Non Final Office Action mailed Jan. 12, 2023", 13 pgs.

(56) References Cited

OTHER PUBLICATIONS

"U.S. Appl. No. 17/750,962, Notice of Allowance mailed Jun. 1, 2023", 9 pgs.
"U.S. Appl. No. 17/750,962, Preliminary Amendment filed Sep. 27, 2022", 5 pgs.
"U.S. Appl. No. 17/750,962, Response filed Apr. 10, 2023 to Non Final Office Action mailed Jan. 12, 2023", 5 pgs.
"U.S. Appl. No. 12/830,290, Response filed May 4, 2015 to Final Office Action mailed Feb. 3, 2015", 10 pgs.
"European Application Serial No. 11172146.0, Examination Notification Art. 94(3) mailed Nov. 28, 2012", 6 pgs.
"European Application Serial No. 11172146.0, Extended Search Report mailed Sep. 23, 2011", 8 pgs.
"European Application Serial No. 11172146.0, Response filed Jun. 7, 2013 to Examination Notification Art. 94(3) mailed Nov. 28, 2012", 12 pgs.
"European Application Serial No. 11172146.0, Response filed Jul. 4, 2012 to Extended Search Report mailed Sep. 23, 2011", 12 pgs.

\* cited by examiner

MULTI-MODE RADIO FOR HEARING ASSISTANCE DEVICES

PRIORITY CLAIM

This application is a continuation of U.S. application Ser. No. 17/750,962, filed May 23, 2022, which is a continuation of U.S. application Ser. No. 16/906,459, filed Jun. 19, 2020, issued as U.S. Pat. No. 11,343,622, which is a continuation of U.S. application Ser. No. 15/963,461, filed Apr. 26, 2018, issued as U.S. Pat. No. 10,694,300, which application is a continuation of U.S. application Ser. No. 15/250,130, filed Aug. 29, 2016, issued as U.S. Pat. No. 9,967,683, which is a continuation of U.S. application Ser. No. 12/830,290, filed Jul. 3, 2010, issued as U.S. Pat. No. 9,432,780, each of which are incorporated by reference herein in their entirety.

FIELD OF THE INVENTION

The present subject matter relates generally to hearing assistance devices, including, but not limited to hearing aids, and in particular to a multi-mode radio for hearing assistance devices.

BACKGROUND

Modern hearing assistance devices typically include digital electronics to enhance the wearer's experience. In the specific case of hearing aids, current designs employ digital signal processors rich in features. Their functionality is further benefited from wireless communications. However, different countries have different frequency bands available for use. And the amount of absorption of radio signals changes significantly with frequency of the signals. Furthermore, communications at different frequencies can require substantially different electronics in various cases.

What is needed in the art is an improved radio for communications for hearing assistance devices.

SUMMARY

Disclosed herein, among other things, are methods and apparatus for hearing assistance devices, including, but not limited to hearing aids, and in particular to a multi-mode radio for hearing assistance devices.

The present disclosure relates to the wireless communication of information for a hearing assistance device including a multi-mode radio adapted to provide communications at different frequencies using frequency control. In applications of hearing aids, the processor is adapted to perform correction of sound for a hearing impaired user. In certain examples the present subject matter provides an inductive portion for inductive communications. In various applications the multi-mode radio can be used for long range and short range communications.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

DETAILED DESCRIPTION

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

The present subject matter relates generally to hearing assistance devices, including, but not limited to hearing aids, and in particular to a multi-mode radio system for long and short range communications for hearing assistance device applications.

Frequencies available for wireless communication such as the ISM frequencies at 900 MHz and 2.4 GHz offer a large amount of bandwidth and allow sufficient RF power to cover many uses for hearing assistance devices. However the frequencies around 900 MHz are not allocated for world-wide coverage. In addition frequencies above 900 MHz are absorbed by human tissue such that a body shadow effect must be accounted for when computing the link budget for ear to ear and ear to body worn electronics. Magnetic links below 30 MHz work well for ear to ear communication and ear to body worn devices since these frequencies are not absorbed significantly by human tissue. Magnetic links also have the advantage of world-wide regulatory acceptance. Frequencies from 100 MHz to 400 MHz have been shown to propagate on the skin of the body and exhibit a loss that is less than that of free space when worn on or near the human body. In addition, legacy narrow band analog FM assisted listening devices exist that have a frequency allocation in the 164-217 MHz band throughout the world.

Figure 1:
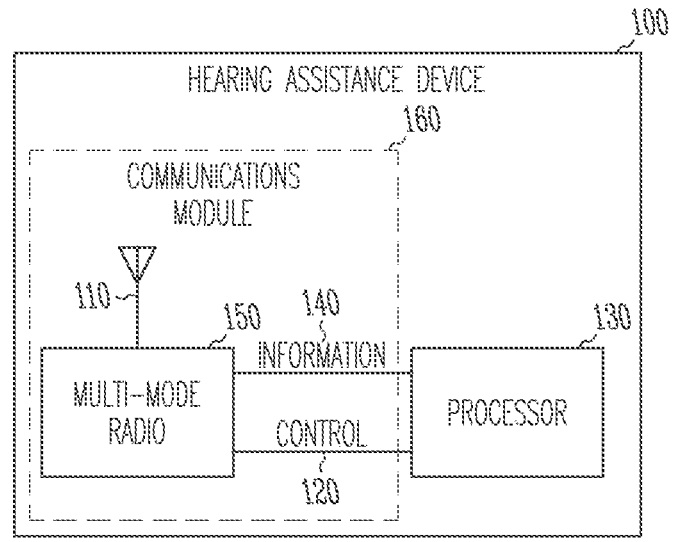
FIG. 1 is a block diagram of a hearing assistance device with a communications module including a multi-mode radio, according to one embodiment of the present subject matter.

FIG. 1 is a block diagram of a hearing assistance device 100 with a communications module 160 including a multi-mode radio 150 according to one embodiment of the present subject matter. The radio 150 receives a frequency control signal 120 that can be set by a variety of mechanisms in various embodiments. In one embodiment, frequency control signal 120 is controlled by processor 130. In one embodiment, frequency control signal 120 is controlled by combinational logic. In one embodiment, frequency control signal 120 is controlled by radio circuits, including, but not limited to a received signal strength indication (RSSI) module to provide input to the selection of frequency by the multi-mode radio 150. These and other types of controls may be used singularly or in combination without departing from the scope of the present subject matter.

In various embodiments the control signal 120 is used to control the frequency of operation of multi-mode radio 150. In various embodiments the control signal 120 is used to control modulation mode of multi-mode radio 150. In various embodiments the control signal 120 is used to select high frequency communications. In various embodiments the control signal 120 is used to select low frequency communications. In various embodiments the control signal 120 is used to select a mode of operation of the multi-mode radio 150. Some embodiments include but are not limited to near range communications, long range communications, and/or combinations of near range and long range communications. Various communication parameters including, but not limited to, combinations of frequencies, modulation techniques, and signal strengths can be controlled in various embodiments. Other communications parameters can be selected without departing from the scope of the present subject matter.

In various embodiments the information signal 140 includes information received by multi-mode radio 150. In various embodiments the information signal 140 includes information transmitted by multi-mode radio 150. In various embodiments the information signal 140 includes control information. In various embodiments information signal 140 is unidirectional. In various embodiments information signal 140 is bidirectional. In various embodiments information signal 140 is half duplex. In various embodiments information signal 140 is full duplex. Other modes and uses of information signal 140 are possible without departing from the scope of the present subject matter.

In various embodiments, the information signal 140 is an output from communications module 160. In various embodiments, the information signal 140 is an input to the communications module 160. In various embodiments, the information signal 140 is communicated as a bidirectional signal from and to the processor 130.

In one embodiment multi-mode radio 150 is a receiver. In one embodiment, multi-mode radio 150 is a transmitter. In various embodiments multi-mode radio 150 performs transmitter and receiver (transceiver) functions. Thus, antenna 110 is used for reception and/or transmission depending on the embodiment of the present subject matter. It is understood that antenna 110 can be any of a variety of antenna types, including a tuned antenna, a multiband antenna, and a broadband antenna. It is understood that antenna 110 can be a variety of structures, including, but not limited to a single element or an antenna array. In various embodiments the antenna 110 is part of the electronics and designed to be integral with the communication module 160. In various embodiments the antenna 110 is electrically connected to communications module 160 but is integral with some other structure. Such other structures include but are not limited to: an antenna element disposed in or on a receiver connector, such as used in a receiver-in-canal (RIC) or receiver-in-the-ear (RITE) designs; an antenna that is integral to the hearing assistance device housing; or a flex tape antenna that can be disposed at least partially within the housing.

Some antenna configurations and related teachings include but are not limited to the following patent applications, which are all hereby incorporated by reference in their entirety: U.S. patent application Ser. No. 10/768,735 (now issued as U.S. Pat. No. 7,256,747); Ser. No. 11/676,420 (now issued as U.S. Pat. No. 7,446,720); Ser. No. 11/357,751 (now issued as U.S. Pat. No. 7,593,538); Ser. No. 12/027,151, filed Feb. 6, 2008; Ser. No. 12/550,821, filed Aug. 31, 2009; Ser. No. 12/340,600, filed Dec. 19, 2008; Ser. No. 12/340,604, filed Dec. 19, 2008; and Ser. No. 12/638,720, filed Dec. 15, 2009. Other antenna configurations and hardware are possible without departing from the scope of the present subject matter.

It is understood that various tuning approaches can be used including, but not limited to, selection of a tuned antenna appropriate for the frequency of operation from a plurality of tuned antennas, automatic matching of an antenna for a selected frequency of operation, a broadband antenna approach and combinations of the foregoing.

In various embodiments processor 130 is adapted to perform hearing assistance processing on the information signal 140. In various embodiments processor 130 includes a digital signal processor. In various embodiments processor 130 includes a microprocessor. In various embodiments processor 130 includes combinational logic. In various embodiments processor 130 is a microcontroller. For example, in hearing aid applications processor 130 is adapted to perform functions associated with programmable gain to improve hearing of a subject with hearing loss. Some embodiments may include one or more aspects including, but not necessarily limited to sub band processing, acoustic feedback cancellation, entrainment reduction, adjustable gain, compression, and/or limiting.

In various embodiments processor 130 is adapted to provide an information signal 140 to communications module 160. In various applications, processor 130 is further adapted to control the frequency of operation of the multi-mode radio 150. In various embodiments, processor 130 is adapted to provide mode control of communications module 160 and/or multi-mode radio 150. For example, one type of mode selection is that the communications module 160 can be used to receive, transmit, or transceive information, in various embodiments of the present subject matter. In various embodiments of the present subject matter communications module 160 is adapted to perform different demodulation and/or modulation techniques, including, but not limited to one or more of frequency frequency shift keying (FSK), frequency modulation (FM), amplitude modulation (AM), single sideband (SSB), spread spectrum, quaternary amplitude modulation (QAM), phase shift keying (PSK), quaternary phase shift keying (QPSK) or pulse width modulation (PWM). In various embodiments the multi-mode radio 150 is adapted to perform transmission and reception at different frequencies. In various embodiments the multi-mode radio 150 is adapted to perform transmission and reception using different modulation techniques. In various embodiments the multi-mode radio 150 is adapted to support hybrid modulation techniques. One such example includes the combination of digital and analog communications, including, but not limited to the communications discussed in U.S. patent application Ser. No. 12/645,007, which is hereby incorporated by reference in its entirety. In various embodiments the multi-mode radio 150 includes control of one or more of the following aspects including but not limited to antenna selection and/or antenna matching. Thus, the present system can provide flexibility and programmability of operation that can be controlled by processor 130, communications module 160, or combinations including one or both of processor 130 and communications module 160.

The multi-mode radio with frequency control allows a hearing assistance device to use a variety of frequencies with minimal or no change in hardware. It also allows a system to use multiple bands to enhance communications based on conditions and/or applications. For example, in designs where signals may have to be received through body tissue, lower frequencies with less absorption can be used. Thus, the system allows for frequency or band diversification with minimal impact to the hardware design. Such designs also allow for programmable channel applications.

In various applications where hearing assistance device 100 is a hearing aid, the device can include one or more of a microphone (or a plurality of microphones), a receiver (also known as a speaker), a telecoil, signal processing electronics, wireless electronics, an antenna, and a housing for the electronics. In some embodiments, the hearing aid includes a connector between the receiver and the housing. In some embodiments, the hearing aid includes a sound tube. In various applications the hearing assistance device is an implant, such as a cochlear implant, which includes one or more electrodes adapted to provide an electrical signal for hearing. These applications are for demonstration only and not intended to be exclusive or exhaustive applications of the present subject matter.

Figure 3:
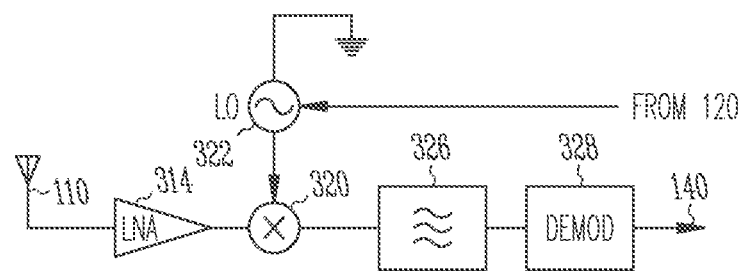
FIG. 3 is a block diagram of a receiver design for a communications module according to one embodiment of the present subject matter.

FIG. 3 is a block diagram of a receiver design for the communications module 160 according to one embodiment of the present subject matter. A signal from the antenna 110 is amplified by low noise amplifier 314 and sent to mixer 320 which receives a local oscillator signal from local oscillator 322. The frequency of the local oscillator is controlled by frequency control signal 120. The mixed signal is sent to bandpass filter 326 which is adapted to pass the information signals of interest to demodulator 328. Demodulator 328 provides an information signal 140 as its output. In various embodiments the frequency control is provided internally by the multi-mode radio. For example, in various embodiments communications module 160 includes additional hardware to receive and process control signal 120 and/or information signal 140. The receiver design shown is intended to demonstrate a receive function of communications module 160. It is understood that variations in components, connections, and implementation may be performed without departing from the scope of the present subject matter and that the demonstrated embodiments are not intended to be exhaustive or exclusive.

Figure 5:
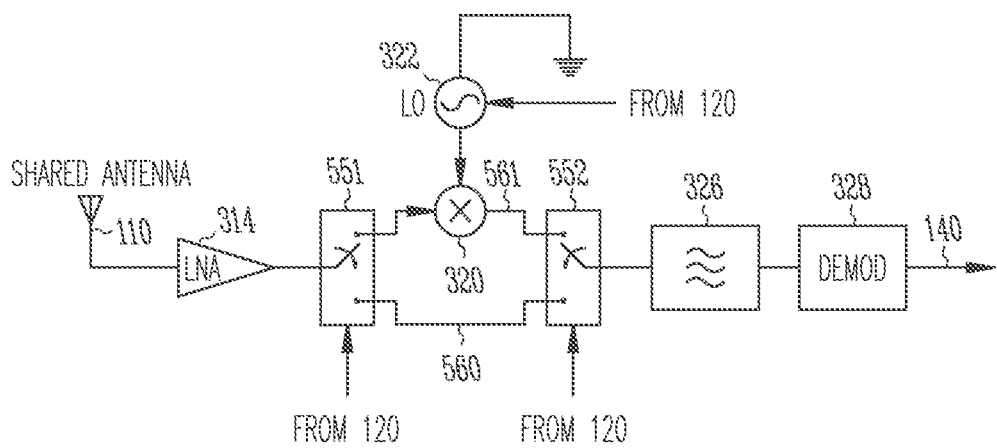
FIG. 5 is a block diagram of a receiver design for a communications module according to one embodiment of the present subject matter.

FIG. 5 is a block diagram of a receiver design for the communications module 160 according to one embodiment of the present subject matter. A signal from the antenna 110 is amplified by low noise amplifier 314 and sent to switch 551 which can direct the signal directly to switch 552 via connection 560 or to mixer 320 which receives a local oscillator signal from local oscillator 322. In various embodiments, the switching of switches (or multiplexer/demultiplexer) 551 and 552 are controlled by control signal 120. In various embodiments the frequency of the local oscillator is controlled by frequency control signal 120. The signal from switch 552 is sent to bandpass filter 326 which is adapted to pass the information signals of interest to demodulator 328. Demodulator 328 provides an information signal 140 as its output. In various embodiments the frequency control is provided internally by the multi-mode radio. For example, in various embodiments communications module 160 includes additional hardware to receive and process control signal 120 and/or information signal 140. The receiver design shown is intended to demonstrate a receive function of communications module 160. In various embodiments the control signals to the switches 551 and 552 are different than the control signal to the local oscillator 322. It is understood that variations in components, connections, and implementation may be performed without departing from the scope of the present subject matter and that the demonstrated embodiments are not intended to be exhaustive or exclusive.

In various embodiments the present subject matter provides an inductive communication mode that can be used in conjunction with the multi-mode radio 150 described above in FIG. 1.

Figure 2:
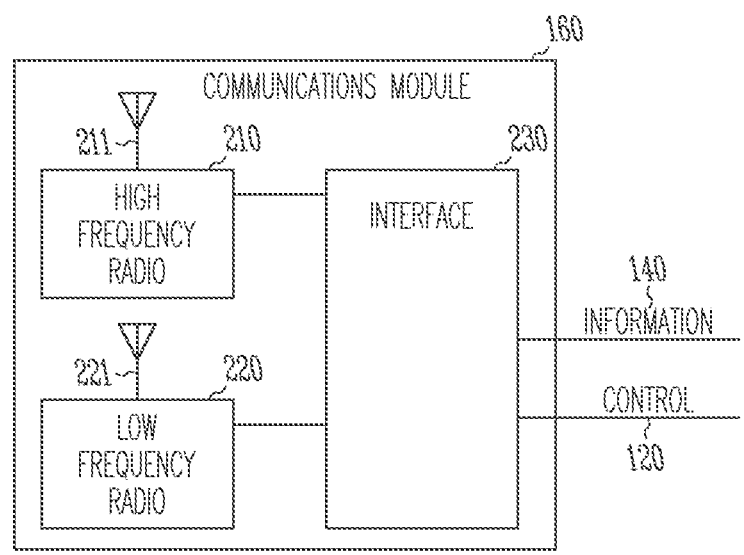
FIG. 2 is a block diagram of a multi-mode radio system for long and short range communications in a hearing assistance device, according to one embodiment of the present subject matter.

FIG. 2 is a block diagram of a multi-mode radio system for long and short range communications in a hearing assistance device, according to one embodiment of the present subject matter. FIG. 2 shows a communications module 160 that includes a high frequency radio 210 with antenna 211 and a low frequency radio 220 and antenna 221. In various embodiments the high frequency radio 210 and low frequency radio 220 are selectable for communications of information signal 140 using interface 230. In various embodiments, the information signal 140 is unidirectional. In various embodiments the information signal 140 is bidirectional. In various embodiments the information signal 140 is provided by reception by the high frequency radio 210 or the low frequency radio 220 or both. In various embodiments the information signal 140 is transmitted by the high frequency radio 210 or the low frequency radio 220 or both. In various embodiments a transceiver function is supported by the high frequency radio 210 or the low frequency radio 220 or both. In various embodiments the low frequency radio 220 is an inductive radio 210. In various embodiments the interface 230 is realized in a processor. In various applications the radio system can support concurrent receive or transmit events using the high frequency radio 210 and the low frequency radio 220. Thus, the system is highly programmable and adaptable.

In various embodiments the interface 230 provides information including, but not limited to, one or both of frequency control information or device enable information to the high frequency radio 210 and the low frequency radio 220 using one or both of the information signal 140 and/or the control signal 120. In various embodiments, the present subject matter provides encryption to the transmissions which is supported by communications between the blocks in the system of hearing assistance device 200. In various embodiments, the present subject matter provides decryption to receptions of hearing assistance device 200. In various embodiments antenna 211 and antenna 221 are realized using a single antenna structure. In various embodiments the single antenna structure is provided using multiplexing of signals between the high frequency radio 210 and the low frequency radio 220. In various embodiments the single antenna structure is provided using multiband antenna designs adapted to operate with the high frequency radio 210 and the low frequency radio 220. In various embodiments antenna 211 and antenna 221 are separate antennas.

Thus, high frequency radio 210, low frequency radio 220, and interface 230 are the blocks of multi-mode radio 150 in various embodiments. It is understood that the discussion above for multi-mode radio 150 applies to the operation of high frequency radio 210, low frequency radio 220, and interface 230.

Figure 4:
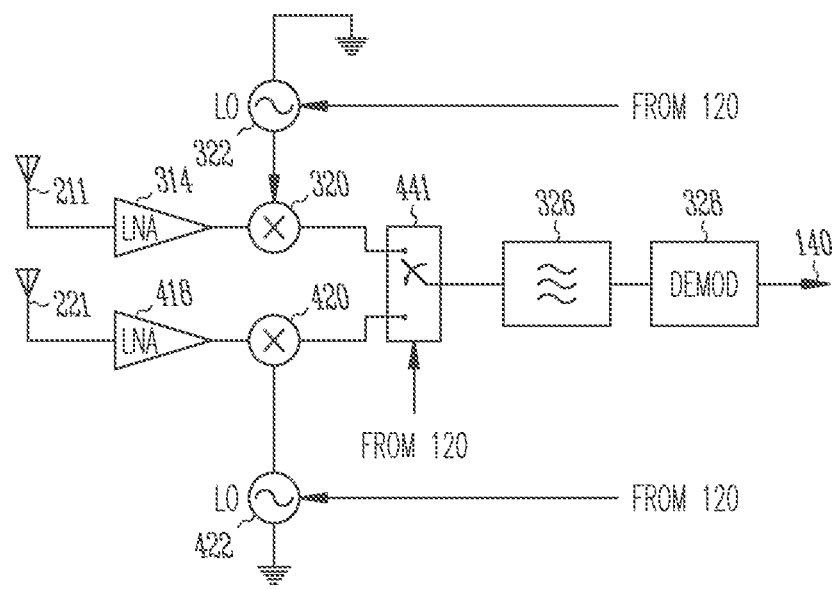
FIG. 4 is a block diagram of a receiver design for a communications module according to one embodiment of the present subject matter.

FIG. 4 is a block diagram of a receiver design for the communications module 160 according to one embodiment of the present subject matter. In a first mode a signal from the antenna 211 is amplified by low noise amplifier 314 and sent to mixer 320 which receives a local oscillator signal from local oscillator 322. The frequency of the local oscillator is controlled by frequency control signal 120. In the first mode the multiplexer 441 connects the output of mixer 320 with bandpass filter 326 which is adapted to pass the information signals of interest to demodulator 328. Demodulator 328 provides an information signal 140 as its output. In various embodiments the frequency control is provided internally by the multi-mode radio. In a second mode communications received by antenna 221 are amplified by low noise amplifier 418 and sent to mixer 420 which also receives a local oscillator signal from local oscillator 422. The output of mixer 420 is sent to bandpass filter 326 via multiplexer 441, depending on the input to multiplexer 441. In various embodiments the input to multiplexer comes from control signal 120. In various embodiments other signals are used to control multiplexer 441.

The output of bandpass filter 326 is demodulated using demodulator 328 to provide information signal 140. The receiver design shown is intended to demonstrate a receive function of communications module 160. It is understood that variations in components, connections, and implementation may exist without departing from the scope of the present subject matter and that the demonstrated embodiments are not intended to be exhaustive or exclusive. For example, it is understood that in various embodiments separate channels can be used for demodulation to provide concurrent reception of signals from antennas 211 and 221. Thus, the present design is demonstrative of only one approach which uses the same baseband demodulation modules, but other embodiments are contemplated by the present disclosure.

Figure 6:
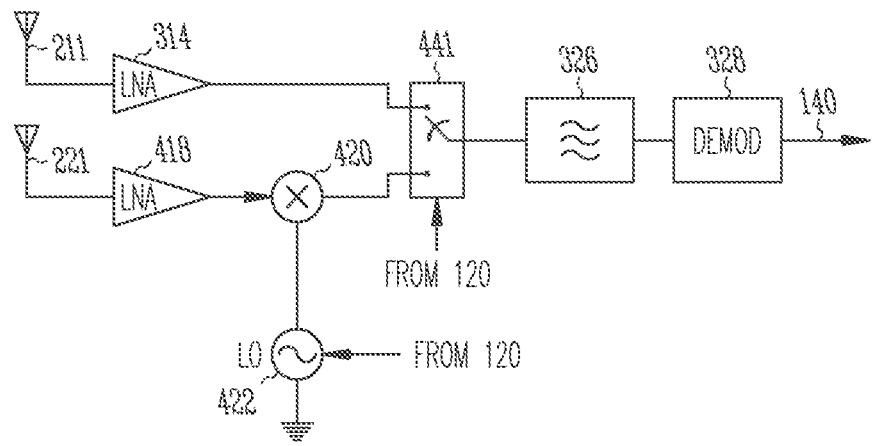
FIG. 6 is a block diagram of a receiver design for a communications module according to one embodiment of the present subject matter.

FIG. 6 is a block diagram of a receiver design for the communications module 160 according to one embodiment of the present subject matter. The embodiment shown in FIG. 6 is similar to that of FIG. 4 except mixer 320 and local oscillator 322 are omitted and the signal from LNA 314 is transferred directly to multiplexer 441. Therefore, this design employs a single local oscillator 422.

In various applications hearing assistance device (100) is a hearing aid. In various applications the wireless communications are between two hearing assistance devices. In various applications the wireless communications are between a first hearing aid and a second hearing aid. In various applications the wireless communications are between a hearing assistance device and any other wireless device. In various applications, the hearing assistance device communicates with a second device that is a wireless audio controller. Some examples of wireless audio controllers are found in U.S. Patent Application Publication 2006/0274747, titled: COMMUNICATION SYSTEM FOR WIRELESS AUDIO DEVICES, and PCT Application Publication WO 2006/133158, titled: COMMUNICATION SYSTEM FOR WIRELESS AUDIO DEVICES, which are both hereby incorporated by reference in their entirety. In various applications, the second wireless device can be any wireless device, and the examples provided herein are intended to demonstrate the present subject matter, but not to limit it to the examples provided herein.

The present subject matter provides various communications, including, but not limited to, one or more of: ear-to-ear communications; ear-to-remote device communications; wireless programming, configuration and data logging; streaming audio; bi-directional audio; and/or remote control. It is understood that these communications can be unidirectional, bidirectional, or combinations of both. Such communications can also include far field communications (e.g., radio frequency communications), or combinations of near field (e.g., inductive link using substantially the magnetic field) and far field communications. Several modes of modulation and demodulation are possible and the examples given herein are demonstrative and not intended to be exclusive or limiting.

In various embodiments the wireless communications can include standard or nonstandard communications. Some examples of standard wireless communications include link protocols including, but not limited to, Bluetooth™ IEEE 802.11 (wireless LANs), 802.15 (WPANs), 802.16 (WiMAX), cellular protocols including, but not limited to CDMA and GSM, ZigBee, and ultra-wideband (UWB) technologies. Such protocols support radio frequency communications and some support infrared communications. Although the present system is demonstrated as a radio system, it is possible that other forms of wireless communications can be used such as ultrasonic, optical, and others. It is understood that the standards which can be used include past and present standards. It is also contemplated that future versions of these standards and new future standards may be employed without departing from the scope of the present subject matter.

The wireless communications support a connection from other devices. Such connections include, but are not limited to, one or more mono or stereo connections or digital connections having link protocols including, but not limited to 802.3 (Ethernet), 802.4, 802.5, USB, ATM, Fibre-channel, Firewire or 1394, InfiniBand, or a native streaming interface. In various embodiments, uch connections include all past and present link protocols. It is also contemplated that future versions of these protocols and new future standards may be employed without departing from the scope of the present subject matter.

In various embodiments a protocol is used, such as the protocol described in U.S. Patent Application Publication 2006/0274747, entitled: COMMUNICATION SYSTEM FOR WIRELESS DEVICES, and PCT Application Publication WO 2006/133158, titled: COMMUNICATION SYSTEM FOR WIRELESS AUDIO DEVICES, which are both hereby incorporated by reference in their entirety. In various embodiments, a protocol is used such as the protocol in U.S. Pat. No. 7,529,565, which is hereby incorporated by reference in its entirety. Other protocols may be used without departing from the scope of the present subject matter.

Thus, the present subject matter provides a multi-mode radio where long range electromagnetic waves can propagate to and from the hearing aids to off body devices including, but not limited to programmers, remote controls, wireless microphones, and/or assisted listening devices.

Since the devices are very programmable and can be set to bands acceptable over the world, the present subject matter can be used to provide reliable ear-to ear links with world-wide acceptance from a regulatory point of view. For example, in various countries operation can be performed by multiple bands such as 902-928 MHz in the US and 863-865 MHz in Europe. The present subject matter also allows for legacy narrow band analog FM receivers used for assistive listening to be successfully received by the same radio in certain embodiments. When one band of frequencies has interference, then another band of frequencies may be free of interference. Thus, a multiband radio provides communication redundancy in the face of interference.

In various embodiments the present approach provides a radio transceiver that has dual, triple, or other modes and bands of operation. For example, a 900 MHz transceiver can be built to operate at 200 MHz as well. In various embodiments, the radio has a mode that supports communication using a carrier that is less than about 30 MHz for ear-to-ear or ear-to-body worn device communication. In various embodiments, a system that has an RF front end capable of 900 MHz operation is built as a single or dual conversion radio having an internal frequency (IF) that is less than about 30 MHz and that can be adapted to transmit and receive a signal directly at frequencies below 30 MHz, thus bypassing the RF front end of the transceiver. In various embodiments the transceiver uses similar modulation schemes at both frequencies so that the demodulator and modulator sections of the transceiver can be used for both frequencies of operation. Alternatively, the transceiver may use a different modulation (multi-mode) scheme at each of the frequencies that best satisfies the link budget and power budget for that band of frequencies. In various embodiments the transceiver incorporates a narrowband analog FM demodulator as part of the receiver for receiving analog FM signals from assisted listening devices in the 169-217 MHz RF spectrum.

The present subject matter provides, among other things, in various embodiments a multi-band transceiver capable of sending and receiving digital or analog information over an RF link using multiple carrier frequencies for use in a hearing aid. The IF frequency of the transceiver can be used to directly receive and transmit information at a different frequency by bypassing the RF front end. In other variations an alternate front end tuned to operate at multiple frequency bands is used. Such a system can use an IF frequency consistent with analog FM assisted listening devices in the 200 MHz region and has an RF front end capable of operating at higher frequencies such as 900 MHz or 2.4 GHz. Variations of the present subject matter include in various embodiments a radio system that uses an IF frequency consistent with magnetic induction (frequencies less than 30 MHz) by bypassing or retuning the front end receiver and transmitter.

The present subject matter provides, among other things, in various embodiments a multi-mode transceiver capable of sending and receiving digital or analog information over an RF link using multi-modes of operation each mode being adapted for use at a different frequency band of operation.

It is understood that variations in communications protocols, antenna configurations, and combinations of components may be employed without departing from the scope of the present subject matter. It is understood that in various embodiments the microphone is optional. It is understood that in various embodiments the receiver is optional. Antenna configurations may vary and may be included within an enclosure for the electronics or be external to an enclosure for the electronics. Thus, the examples set forth herein are intended to be demonstrative and not a limiting or exhaustive depiction of variations.

The present subject matter can be used for a variety of hearing assistance devices, including but not limited to, cochlear implant type hearing devices, hearing aids, such as behind-the-ear (BTE), in-the-ear (ITE), in-the-canal (ITC), or completely-in-the-canal (CIC) type hearing aids. It is understood that behind-the-ear type hearing aids may include devices that reside substantially behind the ear or over the ear. Such devices may include hearing aids with receivers associated with the electronics portion of the behind-the-ear device, or hearing aids of the type having receivers in the ear canal of the user. Such devices are also known as receiver-in-the-canal (RIC) or receiver-in-the-ear (RITE) hearing instruments. It is understood that other hearing assistance devices not expressly stated herein may fall within the scope of the present subject matter.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. A hearing device, comprising:
   a processor, and
   a communications module including a multi-mode radio in communication with the processor, the multi-mode radio configured to receive an information signal and a frequency control signal to provide input for selection of a mode of the multi-mode radio.

2. The hearing device of claim 1, wherein the frequency control signal is received from the processor.

3. The hearing device of claim 1, wherein the frequency control signal is received from combination logic.

4. The hearing device of claim 1, wherein the frequency control signal is received from a received signal strength indication (RSSI) module.

5. The hearing device of claim 1, wherein the multi-mode radio is programmable to provide separate communication channels supporting concurrent communications.

6. The hearing device of claim 1, further comprising a processor configured to process signals to correct for hearing impairment of a wearer of the hearing device.

7. The hearing device of claim 1, further comprising a microphone configured to receive sound and convert the sound to an electrical signal that is provided to the processor.

8. The hearing device of claim 1, further comprising a receiver configured to receive processed signals from the processor and to play sound for a wearer of the hearing device using the processed signals.

9. The hearing device of claim 1, wherein the multi-mode radio is configured to support hybrid modulation techniques.

10. The hearing device of claim 1, wherein the hearing device includes a hearing assistance device.

11. The hearing device of claim 10, wherein the hearing assistance device includes a hearing aid.

12. A method of operating a hearing device, the method comprising:
   receiving, using a multi-mode radio, an information signal and a frequency control signal from a processor of the hearing device; and
   selecting, using the multi-mode radio, a mode of the multi-mode radio based on one or more of the information signal and the frequency control signal.

13. The method of claim 12, wherein the mode includes one or more of electromagnetic communication or inductive communication.

14. The method of claim 12, further comprising: communicating, using the multi-mode radio, with a second hearing device.

15. The method of claim 12, further comprising: communicating, using the multi-mode radio, with a body-worn device.

16. The method of claim 12, further comprising: communicating, using the multi-mode radio, with a remote device.

17. The method of claim 12, further comprising: performing, by the multi-mode radio, transmissions controllable by the processor.

18. The method of claim 17, wherein the transmissions are programmable to be one or more of frequency shift keying (FSK), frequency modulation (FM), amplitude modulation (AM), single sideband (SSB), spread spectrum, quaternary amplitude modulation (QAM), phase shift keying (PSK), quaternary phase shift keying (QPSK) or pulse width modulation (PWM).

19. The method of claim 12, wherein the hearing device is a hearing aid.

20. The method of claim 12, wherein the hearing device is a cochlear implant.

* * * * *